US006903676B1

(12) United States Patent
Frady et al.

(10) Patent No.: US 6,903,676 B1
(45) Date of Patent: Jun. 7, 2005

(54) INTEGRATED RADAR, OPTICAL SURVEILLANCE, AND SIGHTING SYSTEM

(75) Inventors: Trent J. Frady, Bloomfield, IN (US); Dustin L. Wilson, Odon, IN (US); Kyle R. Werner, Jasper, IN (US); Eric S. Moody, Bloomfield, IN (US); Nancy J. Flynn, Bloomington, IN (US); Michael P. Konerman, Bloomington, IN (US); Paul L. Schmidt, Bloomfield, IN (US); Robert E. Mullen, Bedford, IN (US); Mark R. Koi, Bloomington, IN (US); Nigel G. Wasil, Bedford, IN (US); Michael G. Daugherty, Mitchell, IN (US); Bret R. Mehringer, Jasper, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/943,648

(22) Filed: Sep. 10, 2004

(51) Int. Cl.⁷ ............................................... G01S 13/86

(52) U.S. Cl. ...................................................... 342/52

(58) Field of Search ............................. 367/96; 342/52, 342/67, 53, 54; 89/41.14, 41.07, 41.06

(56) References Cited

U.S. PATENT DOCUMENTS

| | | | |
|---|---|---|---|
| 5,471,213 A | * 11/1995 | Hergesheimer | ............... 342/67 |
| 6,249,241 B1 | 6/2001 | Jordan et al. | |
| 6,690,296 B2 | 2/2004 | Corwin et al. | |
| 6,690,978 B1 | 2/2004 | Kirsch | |
| 6,700,528 B2 | 3/2004 | Williams et al. | |
| 6,704,619 B1 | 3/2004 | Coleman et al. | |
| 6,724,340 B1 | 4/2004 | Carlos et al. | |

OTHER PUBLICATIONS

Dustin Wilson; "NSWC Crane and USS Ramage performs IROS3 Demonstration"; http://globalsecurity.org/military/library/news/2004/03/mil–040301–navsea.htm; 2 pg.; Mar. 1, 2004.

"Integrated Radar Optical Surveillance and Sighting System [IROS3]"; http://www.globalsecurity.org/military/systems/ship/systems/iros3.htm; 2 pg.; Mar. 4, 2004.

Jerry Foltz; "IROS3 provides first line of defense"; www.navy.mil/navpalib/cno/n76; 2 pg.; Fall 2003.

Jerry Foltz; "Ramage Tests IROS3 Defense System"; http://www.globalsecurity.org/military/library/news/2003/09/mil–030922–nns02.htm; 1 pg.; Sep. 22, 2003.

David Nagle; "Navy to Demonstrate New Shipboard AT/FP System"; http://www.globalsecurity.org/military/library/news/2003/07/mil–030725–navsea02.htm; 1 pg.; Jul. 25, 2003.

"NSWC Crane Team Completes IROS3 Live Fire Test and Evaluation"; http://www.globalsecurity.org/military/library/news/2003/07/mil–030725 (continued) (continued from NSWC Crane Team . . . ) –navsea01.htm; 1 pg.; Jul. 25, 2003.

\* cited by examiner

*Primary Examiner*—Daniel Pihulic
(74) *Attorney, Agent, or Firm*—Timothy J. Slabouz; John Gladstone Mills, III; NAVAIR Naval Air Systems Command (57) ABSTRACT

The present invention can be generally described as a protection system. This protection system is formed by the integration of commonly available subsystems, which may be controlled by non-proprietary, open architecture software, which, in turn, may accommodate the commonly known "plug and play" capability. This allows the present invention to easily incorporate a variety of lethal (or less-than-lethal) weapon payloads as well as a variety of sensors and detectors; thereby providing the user with the first real, integrated system (of systems) solution capable of providing an enhanced situation awareness capability.

13 Claims, 4 Drawing Sheets

INTEGRATED RADAR, OPTICAL SURVEILLANCE, AND SIGHTING SYSTEM

STATEMENT REGARDING FEDERALLY SPONSORED RESEARCH OR DEVELOPMENT

The invention described herein may be manufactured and used by or for the Government of the United States of America for governmental purposes without payment of any royalties thereon or therefor.

CROSS REFERENCE TO RELATED APPLICATIONS

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

The present invention generally relates to a system capable of detecting, tracking, and, possibly, engaging one or more objects of potential concern, and more particularly, but without limitation, to a system of instruments (and/or other components) capable of providing a protective boundary around a military platform or other entity of interest. (An "object (or "objects") of potential concern" will be either singly or collectively, referred to herein as either the singular or plural form of Target, Contact, and/or Threat; therefore, when any of these terms appear herein they should be considered as being synonymous.)

Today's global environment has led to the need for heightened security measures for both people and possessions including high price military platforms such as, but not limited to, U.S. Navy ships—the USS Cole (DDG-67) was bombed in Aden, Yemen, in October 2000. Because of this bombing and the terrorist attacks of Sep. 11, 2001, it was clear that improved Anti-Terrorism/Force Protection (AT/FP) capabilities were (and are) needed.

More specifically, with respect to U.S. Navy ships, ships need to be protected more than ever from a terrorist attack regardless if sitting in port, at anchorage, or while transiting restricted waterways, and this is the case whether the ship is located in, or is far from, the continental United States or its territorial waters. Moreover, it is often required that a ship's major combat systems (e.g., radar and/or sonar) must be secured (i.e., generally unavailable for use) due to a host nation's rules or regulations, or due to restrictions required by environmentally rules and regulations. Currently, while these combat systems are secured, most shipboard protection on a U.S. Navy ship is provided by utilizing the following equipment and manpower: "crew-manned"weapons; personnel standing sentry duty; vision aids (i.e., binoculars); portable hand-held radios; and Rigid-Hulled Inflatable Boats ("RHIB"). [ASIDE: While the disclosure herein may be focused, in most part, on using the present invention on (or for) ships, and more specifically on U.S. Navy ships, it should be understood that the present invention can be used on, or with, other platforms/entities. Moreover, the acronym RHIB, when used hereinafter, should be considered to refer to not only Rigid-Hulled Inflatable Boats, but also to other remote platforms or other entities, whether mobile or fixed, that are possibly capable of providing at least some of the following: remote detecting; tracking; Contact engagement; and/or may other related function. As a non-limiting example, these can include manned or unmanned aerial, surface, and/or underwater vehicles and/or systems.]

There are disadvantages with the current methods of shipboard protection. For example, the ability to successfully engage a potential threat is constrained by the timeliness of the detection and warning, by the number of personnel available for sentry duties, by the equipment currently used, and by other human perception and skill limitations (including a reduced probability of hit when compared to an automated system). More specifically, the ship's personnel that are required to perform sentry duty may be required to stay alert for extended periods of time, and while walking the ship's deck(s)—many times in the middle of the night and, possibly, under conditions of extreme heat or cold. Clearly, these workplace conditions do not enhance the quality of life and may lead to human-based failures of the protection system. Furthermore, if the sentry personnel do not identify a threat in a timely manner, the response time required for a successful engagement of a potential threat may be lost. This may be exacerbated by requiring the sentry to relay the threat information to a remotely located supervisor prior to receiving authorization to engage the threat, which can cause further delays and, therefore, an increased likelihood of failure. Lastly, with respect to the use of sentries, if the ship's personnel must engage a threat with a crew-manned weapon, those personnel are at risk of injury or death including the risks associated with return fire.

Other sources of failures may be attributable to the equipment being used, or to the combination of equipment and its user's human capabilities. Typically, the best optical aid that ship's personnel have when standing sentry duty is a pair of binoculars. Some of the disadvantages of using binoculars are: limited range; limited field of view (especially when looking at one Contact while another Contact is approaching from another direction); a general dependency on fair weather; and the requirement to be hand-held, which can increase the time needed to man a weapon or which can impede the use of a hand-held radio. Likewise, communications using hand-held radios may be limited by the capability of the sentry to describe the on-going events. The sentry must paint a verbal picture of these events, which can lead to misinformation, incorrect information, or untimely information—all of which may lead to a tactical disadvantage.

Another potential disadvantage is attributable to a ship's RHIB. RHIBs are often sent out to engage (e.g., interrogate or otherwise obtain information on) potentially hostile Contacts that turn out not to be a threat to the main ship. (The term "main ship" when used herein should be taken to mean the military platform or other entity of interest on which the primary user interface (or operator console) of the present invention is installed or where "command and control" is located.) This wastes fuel, time, and/or other resources, and generally increases the need for additional maintenance and/or other services—all of which increase costs. Furthermore, engagement of a non-threat Contact may place the RHIB out of position to engage a real threat. Therefore, a need remains for a low-cost, yet robust, protection system that can provide an improved anti-terrorist and/or personnel protection capability for military platforms as well as for other entities of interest, and which is easy-to-use, and relatively simple to manufacture and install.

BRIEF SUMMARY OF THE INVENTION

According to its major aspects and briefly recited, the present invention relates generally, but without limitation, to a combination of devices that, through such combination, comprise an integrated sensor and communication system capable of providing an automated engagement capability.

More specifically, the present invention is an integrated radar and optical (and, possibly, other component and/or) sensor, surveillance and sighting system ("IROS³") that is capable of providing a "protective umbrella" around a military platform (or other entity of interest). (The terms "platform" and "entity of interest" (in any form) may be considered synonymous, and will be referred to hereinafter as "Platform"). In other words, the IROS³ integrates sensor information, communication data, and/or lethal and/or less-than-lethal/non-lethal engagement resources in order to provide an improved protection capability. Generally, the IROS³ is a potentially autonomous system that may be comprised of well-known, commonly used devices, components, and/or one or more of the Platform's other systems or subsystems.

Preferably, the IROS³ utilizes detection (and/or other relevant) information (and/or other data) from a variety of sources, which may include surface-search/scanning (and/or air-search/scanning) radar, digital navigation systems, and/or from underwater or other sensor systems, primarily for directing (and/or controlling) the engagement and/or other functions of the IROS³. As a non-limiting example, the IROS³ may use detection information (on one or more potential threats) from its surface scanning radar to control one or more of any of the following: electro-optic (and/or any other detection and/or engagement) sensors; high-intensity searchlights (and/or other imaging and/or scanning devices); acoustic hailing device; sentry patrols; manned vehicles; unmanned vehicles (and/or other remotely controlled devices); and/or local and/or remote, weapons. As a result, the IROS³ can increase the protection posture of the Platform (e.g., a surface ship), and may be able to provide this protection regardless of whether such Platform is stationary or in motion.

Operator control of the present invention may be provided by at least one operator console, and, preferably, besides using hard-wired data/communication lines, the IROS³ may be able to utilize other means of communications in order to provide wireless transmission and/or reception of the information provided by (or to) the operator console. Regardless of the method of communications used, the IROS³ is designed to provide such operator console information to all appropriately connected users, which will be referred to herein as the "common tactical scene" ("CTS"). This common tactical scene information may include, but is not limited to, sensor data (including, but not limited to, one or more video feeds), as well as data from other sensors, other inputs, an operator console, and/or from other sources. Preferably the transfer of information can be between (or among), but it is not limited to, the following: local and/or remotely located Platforms; sentries and/or other linked personnel; each RHIB; and any other appropriate facility including, but not limited to, piers and distant command centers. Furthermore, the RHIB, the sentries, and/or other linked users may be able to send video (and/or other information) back to the main ship (or to other linked users) through a variety of components and systems including, but not limited to, electro-optic binoculars, transponders, and/or other suitable information transmission devices.

A feature of the present invention is that it provides an integrated capability to detect, track, classify, and engage potential threats with less-than-lethal/non-lethal and/or lethal options, which provides the advantage of potentially creating a virtual protective envelope around the Platform against waterborne, airborne, and/or underwater threats.

Another feature of the present invention is that it is scalable and flexible, which provides the advantage of allowing the present invention to be tailored to meet a variety of situational awareness, anti-terrorist, force protection, and/or other needs.

Still another feature of the present invention is that it is based on an open-architecture approach with respect to sensor (and/or other) drivers and interfaces, which may provide the advantage of it being able to utilize well-known and readily available devices, components, and/or other systems or subsystems.

Still another feature of the present invention is an ability to provide either or both a lethal and a less-than-lethal/non-lethal engagement response, which provides the advantage of handling a variety of engagement situations in a manner that is appropriate to the level of the threat.

It is a further feature of the present invention to be functionally and operationally simple to use and easily installed, yet be highly durable and reliable.

Another feature of the present invention is that it could be effectively used in a variety of environments including, but not limited to, those constrained by personnel considerations, and/or those subject to vibrations due to the nature of the Platform in which the present invention is being used, e.g., on ships and/or vehicles.

Other features and their advantages will be apparent to those skilled in the art from a careful reading of the Detailed Description of the Invention, accompanied by the drawings.

DETAILED DESCRIPTION OF THE INVENTION

While the following discussion illustrates preferred embodiments of the present invention, it does not limit the present invention from being implemented (and/or configured) in a myriad of other manners within the spirit and scope of this Application. Moreover, while the devices, software, circuits, and/or other components used in the present invention preferably come from the group of devices, software, circuits, and/or other components that are well-known, and/or are commonly (or readily made) available, other means of implementing the present invention may also be used as well. Furthermore, while the name being used herein for the present invention is "Integrated Radar, Optical Surveillance, and Sighting System," it should not be considered that the present invention is limited to using only the named systems, subsystems, and/or components (i.e., "Radar" and/or "Optical" related systems, subsystems, and/or components).

Figure 1:
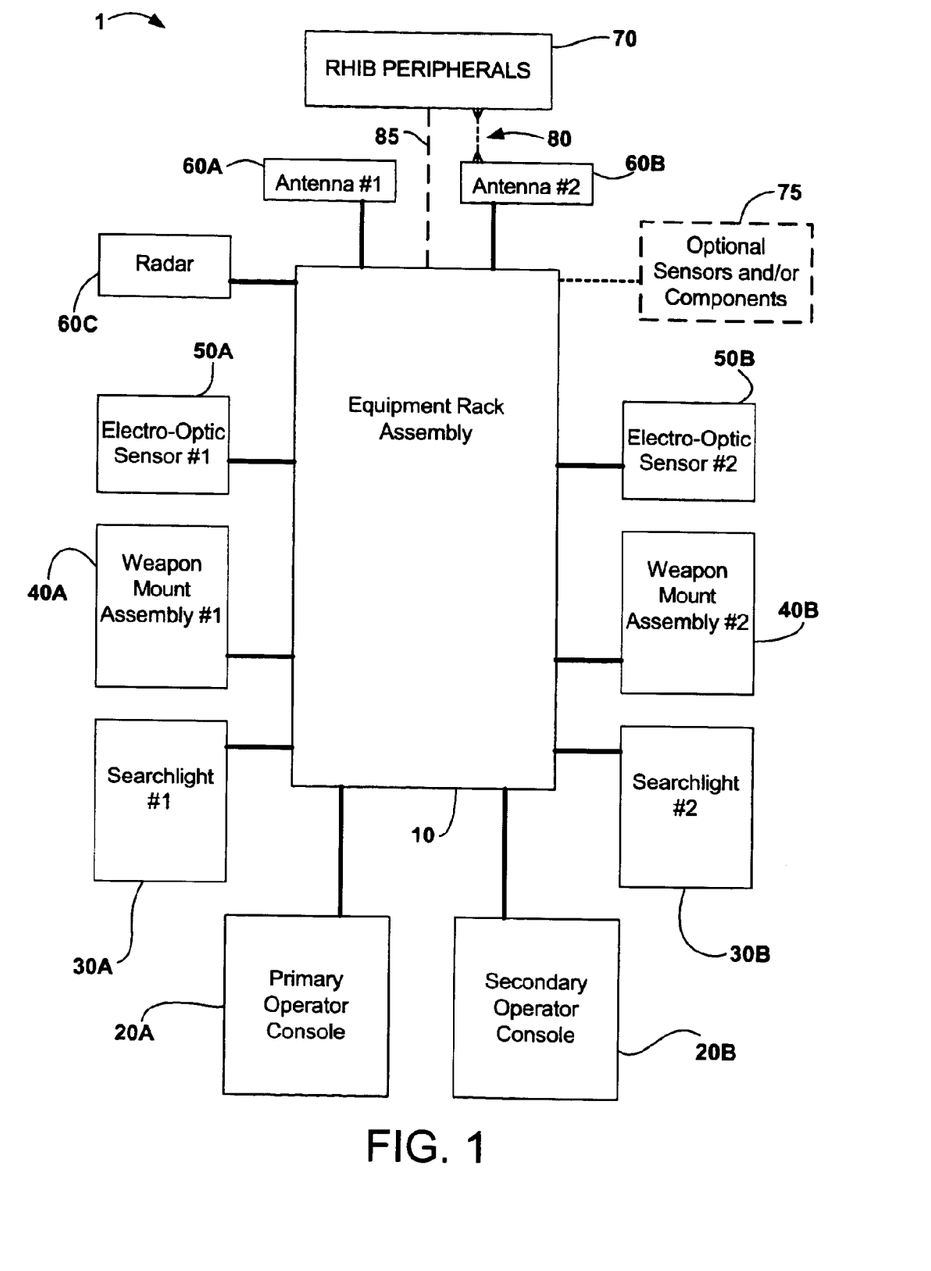
FIG. 1 is a block diagram illustrating a generic system configuration according to a preferred embodiment of the present invention.

Referring now to FIG. 1, a block diagram illustrating a generic system configuration of the Integrated Radar, Optical Surveillance, and Sighting System ("IROS³") 1 is shown. As shown, the IROS³ 1 can use an Equipment Rack Assembly 10 to at least provide equipment centralization for at least portions of the various integrated systems/components, the (location for or the) majority of the central processing and, possibly, a video distribution capability. In this capacity, the Equipment Rack Assembly 10 can be considered as a hardware and/or software "hub" for the components used in the IROS³ 1. Moreover, the Equipment Rack Assembly 10 may be configured to provide power to other IROS³ 1 components (and/or elements). A preferred embodiment of the IROS³ 1 may include, but is not limited to, the following components: an Equipment Rack Assembly 10; a Primary Operator Console 20A; a Secondary Operator Console 20B; Electro-Optic Sensors 30A and 30B; Weapon Mounts 40A and 40B; Searchlights 50A and 50B; Antennae #1 60A; Antennae #2 60B; Radar 60C; RHIB Peripherals 70, and/or Optional Sensors and/or Other Components 75, which, as the label implies, are preferably optional. The Primary Operator Console 20A and/or the Secondary Operator Console 20B are the main user interfaces with the IROS³ 1, and may provide the user with the ability to control the IROS³ 1 either manually or through the use of a semi-automatic mode of operation; however, a fully-automatic mode may also be available. The Operator Consoles 20A and/or 20B are essentially user workstations housing the hardware and/or at least a portion of the software needed to operate the IROS³ 1, and may primarily control the IROS³ 1 through use of a "hand controller" or a "graphical user interface" ("GUI") at an Operator Console 20A and/or 20B, and/or by some other control or interface system or "subsystem(s)." Preferably, at least some computer processing is located within an Operator Console 20A and/or 20B; however, this may be generally limited to local processing for the Operator Console 20A and/or 20B user interface(s)—with the majority of the processing preferably occurring through the use of components and/or systems at or in the Equipment Rack Assembly 10. Preferably the Operator Console 20A and/or 20B logs into the primary controller (i.e., "Payload Interface Controller" or "PIC"), which is preferably located within the Equipment Rack Assembly 10, in order to control sensors, and/or other components, systems (or subsystems), and/or to view, process, and/or manipulate system information. Consequently, by configuring the IROS³ 1 in this way, the IROS³ 1 may have greater flexibility in adding on users and/or other "operator consoles." Relatedly, the messaging and/or contact tracking functions are handled from a centralized control database, which may be resident at (or on) the Equipment Rack Assembly 10, and/or in a remote (IROS³ 1 linked) location, and which may be used to manage most (if not all) of the processing required for the IROS³ 1. Generally, the IROS³ 1 software interfaces with at least some of the following: the Operator Consoles 20A and/or 20B, the operator console hand controllers, video switches, and/or digital input/output switches; the Electro-Optic Sensors 50A and/or 50B; the Searchlights 30A and/or 30B; the Weapon Mount Assemblies 40A and/or 40B; the (surface search or other) Radar 60C; the Antennae 60A and/or 60B; the RHIB Peripherals 70, and/or Optional Sensors and/or Other Components 75. Moreover, the IROS³ 1 preferably handles these items as individual payloads. Furthermore, the software may be written in any language, but it is preferably written in C, C++, and/or JAVA. Moreover, the software may provide (or assist in providing) a "common tactical display scene" ("CTS") to all of the IROS³ 1 users by displaying some portion of the following: digital nautical charts (DNCs) and/or Global Positioning Satellite ("GPS") charts; Contact and/or Platform 300 information; threat rings 315, 316, and/or 317 (shown in FIG. 3); and/or digital data/video from the RHIB and/or other linked users. Still further, each sensor/payload preferably has a direct interface unit, and a slewing capability using the DNCs and the contact list. More specifically, the IROS³ 1 preferably uses a "Payload Interface Controller" ("PIC") to accept, process, and distribute input to and/or from any combination of sources used by (or the users on) the IROS³ 1. Furthermore, the PIC preferably controls most, if not all, camera and gimbal functions, and may be used to provide mechanisms (e.g., switches) to: "arm" the IROS³ 1; arm, aim, and/or fire each weapon; operate range (and/or location) detectors; and/or enable, engage, operate and/or provide any other control of the IROS³ 1.

Operator control of the present invention may be provided by at least one Operator Console 20A and/or 20B; however other means for controlling the IROS³ 1 may be available including, but not limited to, a remote command-and-control location. The IROS³ 1 may use hard-wired data/communication lines, and may be able to utilize other means of communications in order to provide remote control and/or use of the IROS³ 1 including, but not limited to, wireless transmission and/or reception of the information provided by (or to) the operator console. Regardless of the method of communications used, the IROS³ 1 is designed to provide such operator console information (referred to herein as the "common tactical scene" or "CTS") and/or control of the IROS³ 1 to all appropriately connected users. As previously mentioned, the CTS information may include, but is not limited to sensor/detector information, and/or imaging information (including, but not limited to, one or more video feeds), as well as information from other inputs, the Operator Console(s) 20A and/or 20B, and/or other linked users. Preferably, the transfer of information can be between (or among), but it is not limited to, the following: local and/or remotely located Platforms; sentries and/or other linked personnel; each RHIB 70; and any other appropriate facility including, but not limited to, distant command centers. Furthermore, the RHIB 70, the sentries, and/or other linked users may be able to send video (and/or other information) back to the Platform (or to the other linked users) through a variety of components and systems including, but not limited to, electro-optic binoculars, transponders, and/or other suitable information transmission devices. More specifically, and depending on the type of RHIB 70, the RHIB 70 may be able to communicate with the IROS³ 1 through either a wireless 85 and/or a wired means 80 (as shown in FIG. 1).

Preferably, the IROS³ 1 is configured to use common and well-known communication (and/or electrical) standards including the RS422, EIA-232 (formerly RS-232), RS485, NTSC, ethernet, and/or VGA standards; however, other suitable standards could be used as well. Preferably, either or both Operator Consoles 20A and 20B are configured to have at least one information display (and/or display system), and, in a preferred embodiment, each Operator Console 20A and B may have at least one video display to provide video from video input sources such as video cameras. Any camera used to provide these video pictures may be either locally and/or remotely located, and may be capable of providing the transmission of their video signals via hardwired and/or wireless transmission means including, but not limited to, encrypted (and/or non-encrypted) shore-based, air-based, ship (or boat) based, and/or satellite feeds. Furthermore, these (and, possibly, other non-hardwired) signals are preferably fed into the IROS³ 1 via Antenna #1 60A and/or Antenna #2 60B. To provide these video pictures to the user, the IROS³ 1 may use any video display system that has the capability to process and display standard video signal formats such as, but not limited to, the VGA, NTSC, and/or other suitable formats, and may be able to provide well-known multiple "picture-in-picture," and/or other video capabilities as well. Other related features that may be used with the IROS³ 1 include, but are not limited to, capturing some portion of the video (and/or other information) on at least one digital video recorder (or onto one or more hard-drives or other recording medium) so that the information may be capable of being played back upon demand. Preferably, the IROS³ 1 is fully functional in all weather conditions and in any lighting condition—from full daylight to total blackout conditions—and may be configured to be usable with night vision goggles or other night vision aids as well. In a preferred embodiment, other information may also be provided to the user(s) by either or both Operator Consoles 20A and 20B (or from other IROS³ 1 linked sources). This information may be associated with (or a part of) the previously mentioned CTS information and may include, but is not limited to, digital maps and/or navigation charts, informational overlays, Platform and/or Contact status information including, but not limited to: location; speed; and/or direction of motion. Information associated with the IROS³ 1 and/or its components including, but not limited to, visual and/or audible alarms to alert the user of conditions requiring such notification, and/or any other information that may be needed to provide the functions and/or to meet the purposes of the IROS³ 1 may also be provided. Moreover, the provision of information and/or operational control of the IROS³ 1 may be facilitated by one (or more) GUI-based system, which may include at least one touch-sensitive display screen. While the use of at least one GUI-based system is preferable, non-GUI-based systems can be used as well. Preferably, these control systems are at least located on the Operator Consoles 20A and 20B. Moreover, the Operator Consoles 20A and 20B may house or incorporate other facilitation and/or control means and/or methods including, but not limited to, the hardware and/or software needed to incorporate at least one computer-like keyboard, hand-controller, track-ball (or other digital pointing device), and/or other devices. More specifically, the means and/or methods discussed above may be used to at least control the information flow between the users of the IROS³ 1 and/or the functions of any of the following: local and/or remote cameras; the Weapon Mounts 40A and 40B; the Electro-Optic Sensors 50A and 50B; the Searchlights 30A and 30B; the Radar 60C; communications (and/or other signal transmission, reception, and/or processing functions); and/or any other IROS³ 1 linked peripheral equipment including, but not limited to, the Optional Sensors and/or Other Components 75, or the RHIB Peripherals 70 (to be discussed below). The Operator Consoles 20A and 20B and the Equipment Rack Assembly 10 may be located within the interior of the Platform and, preferably, such location(s) will be within at least one well protected area. Many of the other components and/or systems, including, but not limited to, at least some portion of the following: the Electro-Optic Sensors 30A and 30B; the Weapon Mounts 40A and 40B; the Searchlights 50A and 50B; Antennae #1 60A; Antennae #2 60B; and/or the Radar 60C, may be located on or near the exterior of the Platform and, preferably, in locations that could possibly maximize the performance of the IROS³ 1—preferably by considering and by possibly maximizing at least some of the following characteristics: Field-of-View, Contact detection, tracking and/or engaging; and/or communications (including the transmission of operational and/or control data and/or signals). Relatedly, the RHIB Peripherals 70, and/or possibly one of more of the Optional Sensors and/or Other Components 75 may be located away from the Platform, and, if any are so located, they may be able to communicate with the IROS³ 1 using a wired and/or wireless means. It should be noted, however, that while these aforementioned methods and/or means of operating and/or controlling the IROS³ 1 may be preferable, any other suitable means and/or methods could be used as well including, but not limited to, those methods and/or means that are equivalent to those discussed herein.

In general, the IROS³ 1 may use, but is not limited to, one or more of the following: searchlights, weapons, sensors/detectors, antennae, and/or communications devices, as part of the IROS³ 1 system. In a preferred embodiment shown in FIG. 1, the IROS³ 1 has two searchlights, two weapon assemblies, two electro-optic sensors, two antennae and/or communication devices, a radar, and peripheral "equipment," which may include, but is not limited to the RHIB. The Searchlights 30A and 30B are preferably high powered, long-range, and high-intensity (i.e., large candela rating) lights, and, as an example, may be of the type commonly used as security lighting at military installations and/or as surveillance lighting on military and/or law enforcement ships and/or aircraft. Preferably the Searchlights 30A and 30B are capable of being remotely operated by the IROS³ 1, and may include an automatic Contact-tracking capability. Preferably, the Electro-Optic Sensors 50A and 50B may be (or are similar to) the Wescam Model 14Q; however, other EO sensors and/or vision systems could also be used including, but not limited to, Argos Vision System's POP-200, Raytheon's AN/AAS-44, which includes a laser designator for targeting, and/or Raytheon's AN/AAS-52 Multispectral Targeting System (MTS), which, in general, is a sensor ball incorporating a laser designator and color EO and IR cameras. Likewise, the Radar 60C may be (or is similar to) the Furuno Model 841 and/or the Model 8111-4 radar, which are of the surface scanning/search type radars. However, other radar (and/or detection) systems could also be employed as primary, secondary, and/or as additional detection components of the IROS³ 1. For example, the IROS³ 1 may use one or more air-scanning/air-search radar, combination air and surface-scanning/search radar, IR and/or other electromagnetic energy detection device, sonar and/or other acoustic-based detection device. Moreover, the IROS³ 1 may use one or more motion detection device including, but not limited to, those that are (or may be) based on ultrasonics, "magnetic anomaly detection" or "broadband electromagnetic detection and discrimination." Moreover, Antenna #1 60A may at least be used as a "Time Synchronization Server," which may be used to obtain a time signal for the IROS³ 1 from a GPS satellite or other suitable device, and either or both antennae 60A and/or 60B may be used for communications. The ability of the IROS³ 1 to engage a Contact may be provided by weapons that are attached or mounted onto the Weapon Mount Assemblies 40A and/or 40B. Preferably, each Weapon Mount Assembly 40A or 40B may be generally described as a motorized support or base that is configured to accept a variety of weapons through the use of mounting hardware and/or other components, and is preferably configured to provide up to a full panning and/or tilting capability for the aiming and/or firing of a weapon. However, full panning and/or tilting may be limited by safety interlocks, which may be implemented electronically and/or by using "hard-stops" on the Weapon Mount Assembly 40A and/or 40B. The Weapon Mount Assemblies 40A and 40B preferably use high-speed motors and are provided with at least one motion compensation (and/or stabilization) system to compensate for Platform motion, e.g., the pitch and roll of a ship. In this regard, at least one-axis of stabilization may be provided, but preferably at least two-axes of stabilization are used with the IROS³ 1. Preferably, manual, or semi-automatic control of the Weapon Mount Assemblies 40A and/or 40B (and, therefore, the weapons) are provided at the operator console; however, a fully automatic mode may be available as well. In one embodiment of the IROS³ 1, the Weapon Mount Assemblies 40A and 40B are configured to handle loads weighing up to about 250 lbs. This allows the IROS³ 1 to control a variety of weapons including, but not limited to, small arms products, missiles, and directed energy weapons. As a non-limiting example, the IROS³ 1 may use weapons like (or similar to): the GAU-17A, 7.62 mm Gatling gun; single (or twin) M2 HG, .50 caliber machine guns; MK 19, 40 mm grenade launcher, the M60 or M240 machine gun; and/or a variety of less-than-lethal, or a combination lethal/less-than-lethal weapons. Less-than-lethal weapons may include, but are not limited to, flares, acoustic-based, chemical-based, and/or odorant-based instruments, as well as other appropriate offensive and/or defensive means of deterrence and/or suppression. Moreover, the Weapon Mount Assemblies 40A and 40B may be provided with at least one video or other imaging transmission device, which may include, but is not limited to, an infrared camera, and/or at least one electro-optic sensor. Moreover, it may be configured with an auto-Contact-tracking feature, which may include the use of the above-mentioned electro-optic sensor. Furthermore, the Weapon Mount Assemblies 40A and 40B may accept tracking, aiming and/or firing signals from one of more of the following: any (or all) of the Antennae 60A and/or 60B; through the Operator Consoles 20A or 20B; the Radar 60C; any (or all) of the Electro-Optic Sensors 50A and/or 50B; and/or preferably through the Weapon Mount Assembly itself 40A or 40B—preferably by using an on-Mount 40A and/or 40B electro-optic camera with auto-tracking capability.

Figure 2A:
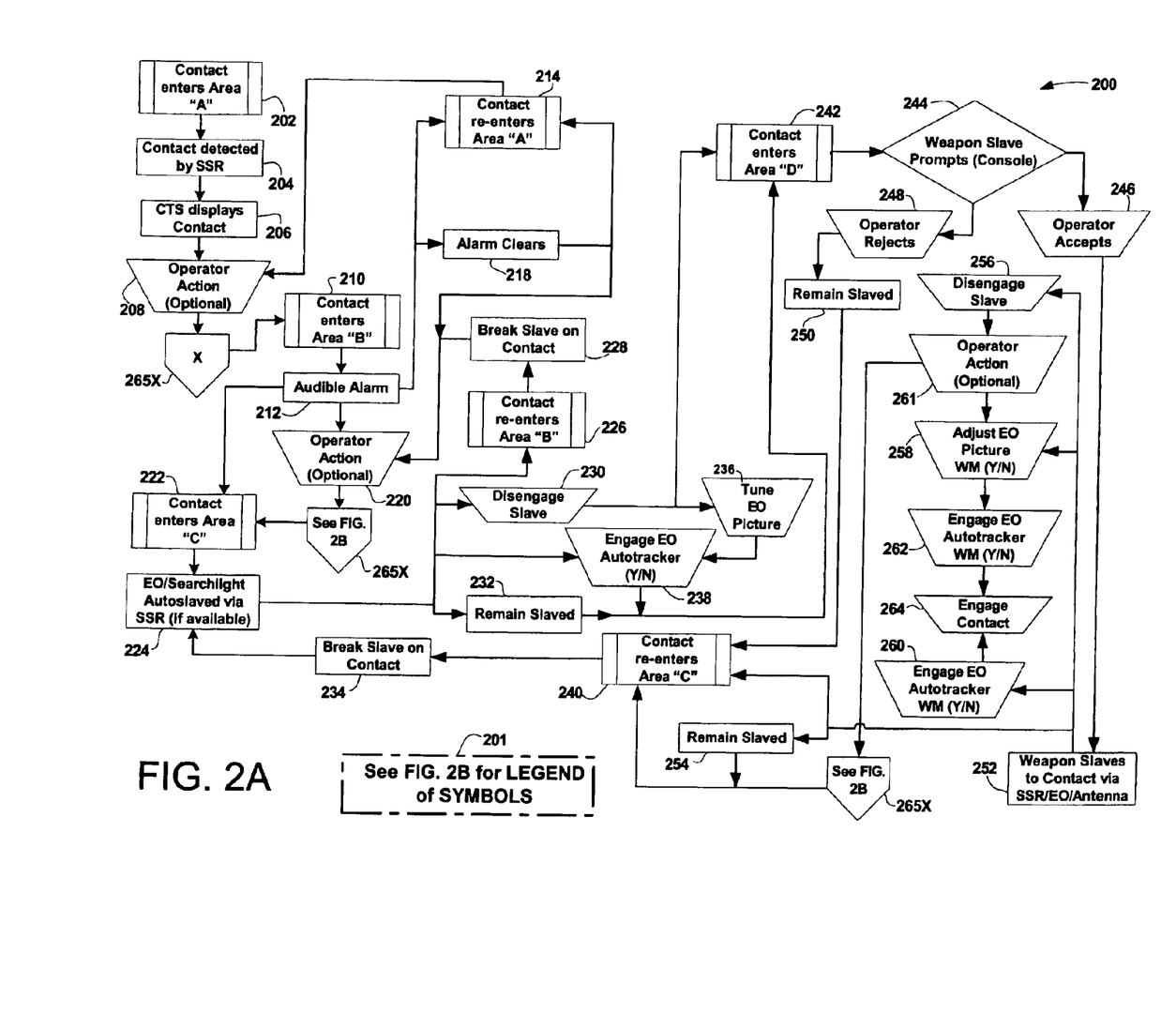
FIGS. 2A and 2B is a flow chart illustrating a generic functional sequence comprising detecting, tracking, and/or engaging a single Contact using a preferred embodiment of the present invention.
Figure 2B:
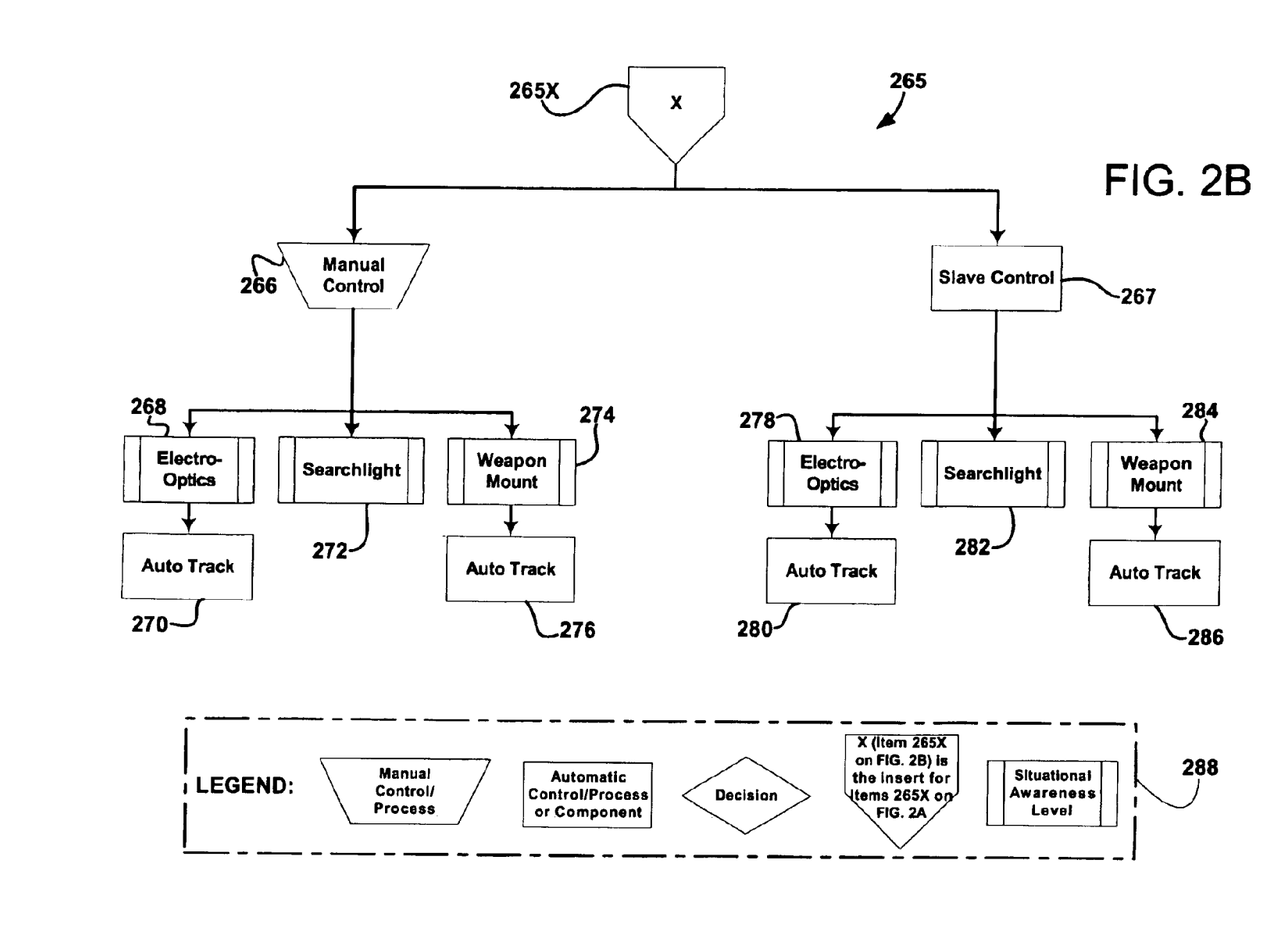

The IROS³ 1 may be configured to have at least two modes of operation. Preferably, these modes are a "Semi-Automatic" and a "Manual" mode; however, other modes including, but not limited to, a "Fully Automatic" mode may also be available. While a Semi-Automatic mode is preferred, the Manual mode, if available, may be used to override semi-automatic and/or automatic responses from the IROS³ 1, and such mode may be configured so that automatic functions and/or alarms are unavailable. Moreover, the Semi-Automatic mode may include the below-described semi-automated responses, which are used to execute the IROS³ 1 "Detect-To-Engage" sequence 200 (shown in FIG. 2A, and showing detail of a FIG. 2A sequence step 265X on FIG. 2B). [Also, FIG. 2B shows a LEGEND 288 for the symbols shown in FIGS. 2A and 2B.]

Figure 3:
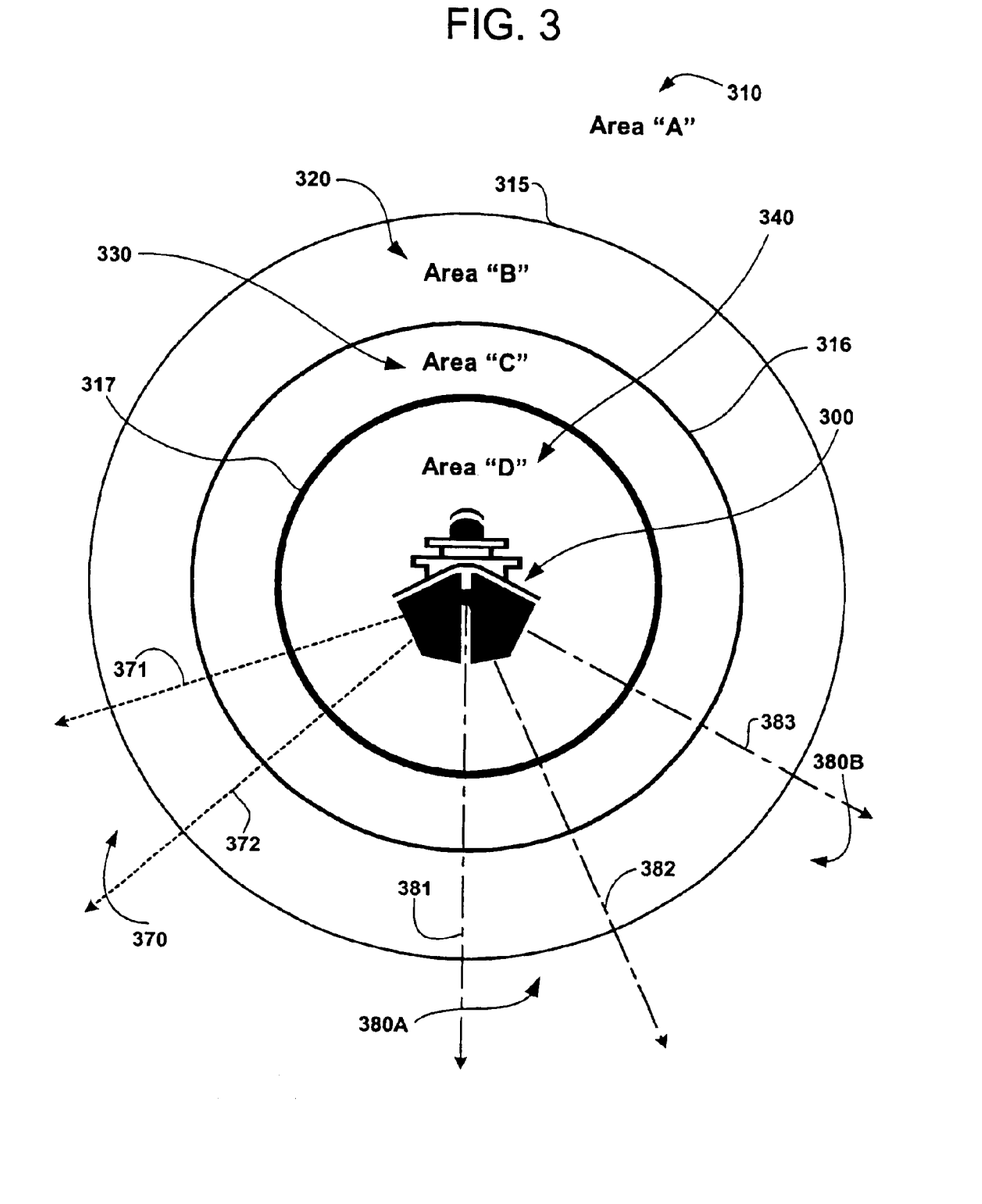
FIG. 3 is an illustration of the concept of the present invention in a semi-automatic mode of operation according to a preferred embodiment of the present invention.

In operation, at least the Detect-To-Engage sequence 200 may be based on providing virtual Platform-enclosing areas of protection. Referring now to FIG. 3, an example of such areas is shown. In FIG. 3, a ship is used as a representative example of a Platform 300, and, as shown, is located in Area "D" 340 and is enclosed within Area "C" 330, Area "B" 320, and Area "A" 310. (While concentric circles are described in the example herein (as shown in FIG. 3), other suitable boundaries, of other varying shapes and/or sizes, can preferably be set by the user and/or automatically set or adjusted by the IROS³ 1.) In this regard, the IROS³ 1 can be configured to have default settings for each boundary, and, as an example, a default setting of three concentric circles having radii of five thousand (5000) yards 317, seventy-five hundred (7500) yards 316, and ten-thousand (10000) yards 315 from the Platform 300 could be used. Relatedly, also shown in FIG. 3, other boundary or sub-boundary areas could be separately or concurrently established and used. As a non-limiting example, the IROS³ 1 may be capable of allowing the user to establish sectors of high and/or low importance (or concern), and/or may allow the user to characterize and/or define areas in a variety of other manners or for a variety of other purposes. As a non-limiting example, which is shown in FIG. 3, an area not requiring a response, or a "No Response Sector" 370, and/or a "Closest Point of Approach Sector" ("CPA Sector") 380A and/or 380B can be established. In addition, as shown in FIG. 3, a "No Response Sector" 370 is the area bounded by the IROS³ 1 generated No Response Boundary Lines 371 and 372, and two "CPA Sectors" 380A and 380B are the areas bounded by the IROS³ 1 generated CPA Boundary Lines 381 and 382, and 382 and 383, respectively. A purpose for a "No Response Sector" 370 may include, but is not limited to, the provision of the ability to allow a user to ignore a particular area of "non" interest while one purpose for a "CPA Sector" 380A and/or 380B may be, but is not limited to, allowing a user to establish areas that may be of special concern. Preferably, the number of boundaries and/or sectors, and/or their shape may be user-defined and then made a part of the CTS, either as a separate boundary or as an overlay to the threat rings or other CTS boundaries, and, while this may be preferable, the number of sectors and/or their shape may be pre-determined and possibly hard-coded as well. One "tracking" (or surveillance) method that may be used with the "CPA Sectors" 380A and/or 380B, or possibly with any other IROS³ 1 boundary, is known as the "Closest Point of Approach" ("CPA"). Generally, this method is based on the making of a, preferably, computerized determination of the closest possible distance between two dynamically moving objects, and is commonly used as an important calculation for collision avoidance systems. In many cases of interest, the objects (or Contacts), and/or the Platform 300, are commonly referred to as "tracks." These "tracks" can be generally described as "points" moving in two fixed directions at fixed speeds, and are moving along two lines in space. However, their closest distance is not always the same as the closest distance between the lines since the distance between the points must be computed at the same moment in time. Therefore, even in two-dimensional space, moving points (or objects and/or Contacts) located on two intersecting lines (or tracks) may remain far apart. However, if one of the tracks is stationary, then the CPA of another moving track is at the base of the perpendicular from the first track to the second object's line of motion, which may be utilized in making the CPA determination. More specifically, CPA criteria, which may be used in defining a "CPA Sector" 380A and 380B, also may include, but is not limited to, sector identifiers, locations, time and/or distance thresholds. Then, if one of the established thresholds is exceeded by a Contact (and/or object), the IROS³ 1 can provide an audible alert to the user and/or perform other actions as appropriate. In this regard, therefore, it may be possible that the users of the IROS³ 1 may not be using the CPA tracking method for the reason of collision avoidance in the classic sense, but may be concerned with collision avoidance in the sense that a Contact could be loaded with explosives and is making a direct line for the Platform at a high rate of speed.

As background of the operation of the IROS³ 1 and in general, while the IROS³ 1 is monitoring the environment, if there are no Contacts, the Platform 300 and/or the IROS³

1 could be considered to be in a base-line monitoring or tracking level, which can be described as a low "situational awareness" level. This situational awareness level changes, however, when a Contact enters one of the monitored areas 310, 320, 330 or 340 (as shown in FIG. 3) and as represented by several of the Sequence 200 blocks 202, 210, 222, and 242 (as shown in FIG. 2A). Furthermore, as shown by the Sequence 200, the level of the response that a change in situational awareness entails (which may be semi-automatic, manual, and/or automatic) is symbolized by the activity represented by the blocks that are linked to these blocks 202, 210, 222, or 242. Moreover, as is readily apparent from the Sequence 200, as the distance between a Contact and the Platform 300 decreases, the level of response preferably increases, and vice versa. It should be noted, however, that a Contact identified as friendly may be removed from consideration by the IROS³ 1 and/or the user/operator, and, as a non-limiting example, this may be accomplished by the software and/or hardware used for providing the display of the common tactical scene. Now referring to FIGS. 1, 2A, 2B, and 3, a non-limiting example of the Semi-Automatic mode, Detect-To-Engage 200 sequence (Sequence) follows.

First of all, one of the IROS³ 1 sensors detects a Contact. In this example, a Contact enters Area "A" 310 (as shown in FIG. 3 and by the "Contact enters Area 'A'" block 202 on FIG. 2A), and is detected by the Radar 60C (as shown in FIG. 1). The Radar 60C, for this example, is a surface-search radar ("SSR"), and the detection is represented by the "Contact detected by SSR" block 204. Additionally, the display of information associated with the common tactical scene and/or the detection of the Contact is represented by the "CTS displays Contact" block 206. Optional user intervention is represented by the "Operator Action (Optional)" block 208 and the "X" block 265X, which refers to the manual and/or slaved operations shown in FIG. 2B. Next, if the Contact changes situational status by moving from Area "A" 310 into Area "B" 320, the next portion of the Sequence 200 is entered. This portion may include one or more of the following blocks: "Contact enters Area "B" 210; "Audible Alarm" 212; "Alarm Clears" 218; user intervention blocks represented by "Operator Action (Optional)" 220 and "X" 265X; and/or Contact location status (or situational awareness level) change blocks as represented by "Contact re-enters Area 'A'" 214 or "Contact enters Area 'C'" 222. More specifically, if the Contact enters Area "B" 320 by crossing the outer circle (or boundary interface) 315, which has a default setting of ten-thousand yards in this example, at least one audible and/or visual alarm is activated at the Operator Consoles 20A and 20B, and, possibly, to any of the linked remote users of the IROS³ 1. Moreover, each operator and/or user may have the discretion to at least acknowledge alarms, view the data on the Contact (including, but not limited to, visual images of the Contact), and/or place the IROS³ 1 in Manual, Semi-Automatic, or Automatic Mode at this time. If the Contact crosses the second boundary interface 316 and enters into Area "C" 330, which occurs at seventy-five hundred yards in this example, and, "if available" (i.e., not currently being used for tracking of another Contact, or etc.), the appropriate (which may be the closest) Electro-Optic Sensor 50A or 50B and Searchlight 30A or 30B may be slaved to the Contact. This may allow for the auto-tracking of the Contact with the Electro-Optic Sensor 50A or 50B, with the Radar 60C (as represented by blocks 222 and 224), and/or with any other tracking components or devices. However, and alternatively, the IROS³ 1 user/operator may manually control the Electro-Optic Sensor 50A or 50B and/or the Searchlights 30A or 30B to track the Contact. In other words, the operator (and/or user), the appropriate Electro-Optic Sensor 50A or 50B, and/or Searchlight 30A or 30B may follow or track the Contact by using the manual and/or automatic tracking features of the IROS³ 1. This portion of the Sequence 200 may also include one or more of the following blocks: "Remain Slaved" 232; "Disengage Slave" 230; "Engage EO Autotracker (Y/N)" 238; "Tune EO Picture" 236; and/or a Contact location status (or situational awareness level) change block represented by "Contact re-enters Area 'B'" 226, which may be associated with the "Break Slave on Contact" block 228.

Continuing with the example, the maximum situational awareness level may occur when a Contact crosses the inner boundary interface 317 and enters into Area "D," which occurs at five thousand yards in this example. Under these circumstances, at least one prompt may be displayed to each operator (and/or user) to slave the Weapon Mount Assembly 40A and/or 40B to the Contact (as represented by the "Weapon Slave Prompt" block 244). Preferably, all other operator (and/or user) actions are locked out until the operator (and/or user) responds to the Weapon Slave Prompt 244, e.g., YES or NO selections may be made via the Operator Consoles 20A and 20B—as respectively represented by the "Operator Accepts" block 246 and the "Operator Rejects" block 248. Then, if the operator (and/or user) chooses to slave either (or both of) the Weapon Mount Assembly 40A and/or 40B to the Contact, the Weapon Mount Assembly 40A and/or 40B may automatically "follow" the Contact's movements. As a non-limiting example, this may be implemented by using an Electro-Optic sensor 50A and/or 50B and/or radar 60C, and/or by using an auto-tracker sending signals to either or both of the Weapon Mount Assembly's 40A and/or 40B controller(s), and, preferably, at least one electro-optic sensor and/or auto-tracker (not shown) may be mounted to the Weapon Mount Assembly 40A and/or 40B to provide this feature. At this point in the Sequence 200, the Contact (target) may be lethally (or less-than-lethally) engaged—depending on the weapon and/or the discretion of the operator (and/or user). Moreover, this portion of the Sequence 200 may include one or more of the following blocks: "Contact enters Area "D" 242; "Weapon Slave Prompt" 244; and "Operator Rejects" 248, "Remain Slaved" 250, and "X" 265X or, alternatively, "Operator Accepts" 246, and "Weapon Slaves to Contact via SSR/EO Sensor/Antenna." Preferably, such slaving may be implemented with an on-Weapon Mount 40A and/or 40B electro-optic sensor having auto-tracking capability. Associated with this block 252, are the additional user intervention blocks represented by "Disengage Slave" 256, "Tune EO Picture (WM)" 258, "Engage EO Autotracker WM (Y/N) 260, "Operator Action (Optional)" 261, "Engage EO Autotracker WM (Y/N) 262, and/or "Engage Contact" 264. ["Tune EO Picture (WM)" 258, represents the tuning of the images from the Weapon Mount Assembly 40A and/or 40B, and "Engage EO Autotracker WM (Y/N) 260 and 262, represents the autotracker feature of the electro-optical device associated with the Weapon Mount Assembly 40A and/or 40B.] Also possibly associated with this portion of the Sequence 200 is the Contact location status (or situational awareness) change block represented by "Contact re-enters Area 'C'" 240. Preferably, if a Contact of interest turns away from the Platform 300 and leaves Area "D" 340, Area "C" 330, and/or Area "B" 320, the operator (and/or user) may release control of the "engaged" Weapon Mount Assembly 40A and/or 40B, and/or the IROS³ 1 may be configured so that semi-automated (and/or fully-automated) responses are not automatically initiated for any retreating Contact.

Finally, it will be apparent to those skilled in the art of surveillance systems design (and/or other related fields) that many other modifications and/or substitutions can be made to the foregoing preferred embodiments without departing from the spirit and scope of the present invention. The preferred embodiments and the best mode of the present invention are described herein. However, it should be understood that the best mode for carrying out the invention herein described is by way of illustration and not by way of limitation. Therefore, it is intended that the scope of the present invention include all of the modifications that incorporate its principal design features, and that the scope and limitations of the present invention should be determined by the scope of the appended claims and their equivalents.

What is claimed is:

1. A protection system, said protection system comprising:
   a. a plurality of sensors for detecting a target object and for generating at least one information signal corresponding to said object, and wherein said plurality of sensors comprising at least one surface search radar and at least one electro-optic sensor;
   b. means, in operational communication with said plurality of sensors, for processing said information signal;
   c. means, in operational communications with said processing means, for generating a display, wherein said display generating means is capable of incorporating said at least one information signal as part of said display;
   d. means, in operational communication with said processing means, for generating a tracking signal for each said target object; and
   e. means, in operational communications with said processing means, for engaging said target object.

2. A protection system, said protection system comprising:
   a. at least one equipment rack assembly capable of receiving and transmitting, and processing, protection system information signals and protection system control signals;
   b. at least one surface search radar, in operational communications with said at least one equipment rack assembly, capable of detecting at least one target object, and of generating and transmitting at least one radar target signal, said at least one radar target signal being at least one of said protection system information signals;
   c. at least one antenna, in operational communications with said at least one equipment rack assembly, for providing wireless communications for said protection system;
   d. at least one electro-optic sensor, in operational communications with said at least one equipment rack assembly, capable of detecting said at least one target object, and of generating and transmitting at least one electro-optic target signal, said at least one electro-optic target signal being at least one of said protection system information signals, and said at least one electro-optic sensor is capable of receiving at least one of said protection system control signals for controlling the positioning of said at least one electro-optic sensor;
   e. at least one weapon mount assembly, in operational communication with said at least one equipment rack assembly, for carrying at least one weapon and for providing a visual aiming signal, said visual aiming signal being at least one of said protection system information signals, and said at least one weapon mount assembly is capable of receiving at least one of said protection system control signals for controlling the positioning of said at least one weapon mount assembly;
   f. at least one illumination device, in operational communications with said at least one equipment rack assembly, said at least one illumination device capable of receiving at least one of said protection system control signals for controlling the positioning of said at least one illumination device;
   g. at least one operator console, in operational communications with said at least one equipment rack assembly, for providing at least one user with the ability to operationally control said protection system; and
   h. at least one means, in operational communications with said at least one equipment rack assembly, for intercepting said at least one target object.

3. The protection system as recited in claim 2, wherein said equipment rack assembly further comprises at least one computer processor.

4. The protection system as recited in claim 2, wherein said wireless communication is between said protection system and at least one remote user of said protection system.

5. The protection system as recited in claim 2, wherein said at least one weapon is capable of being remotely aimed and fired at any of said at least one target object by said protection system.

6. The protection system as recited in claim 2, wherein said at least one weapon is capable of being manually aimed and fired at any of said at least one target object by said at least one user of said protection system, wherein said at least one user is remotely located from said at least one weapon.

7. The protection system as recited in claim 2, wherein said at least one target intercepting means is a manned vehicle capable of allowing any user of said manned vehicle to at least evaluate, deter, and suppress, said at least one target object.

8. The protection system as recited in claim 2, wherein said wireless communication is between said protection system and at least one remotely connected sensor.

9. The protection system as recited in claim 8, wherein said at least one remotely connected sensor is an aerial vehicle.

10. The protection system as recited in claim 8, wherein said at least one remotely connected sensor is an unmanned underwater vehicle.

11. The protection system as recited in claim 8, wherein said at least one remotely connected sensor is unmanned aerial vehicle.

12. The protection system as recited in claim 8, wherein said at least one remotely connected sensor is an unmanned surface vehicle.

13. A method of providing protection for a ship, said unprotection method comprising the steps of:
   a. providing an operationally active protection system, said protection system comprising:
      (i) a plurality of sensors for detecting a target object and for generating at least one information signal corresponding to said target object;
      (ii) means, in operational communications with said plurality of sensors, for processing said information signal;
      (iii) means, in operational communications with said processing means, for generating a display, wherein said display generating means is capable of incorporating said at least one information signal as part of said display;

(iv) means, in operational communications with said processing means, for generating a tracking signal for each said target object; and (v) means, in operational communications with said processing means, for engaging said target object;

b. establishing boundary areas around said ship;

c. surveilling said boundary areas for at least one potential threat;

d. detecting said at least one potential threat; and e. engaging said at least one potential threat.

* * * * *